(12) United States Patent
Reithmaier et al.

(10) Patent No.: US 10,408,249 B2
(45) Date of Patent: Sep. 10, 2019

(54) SCREW CONNECTION FOR A COMPONENT MADE OF THERMOPLASTIC MATERIAL

(71) Applicant: Lisa Draexlmaier GmbH, Vilsbiburg (DE)

(72) Inventors: Tanja Reithmaier, Aich (DE); Norbert Simon, Geisenhausen (DE); Leonard Dobos, Kröning (DE); Gregor Hoedl, Ergoldsbach (DE); Johann Petermaier, Dingolfing (DE)

(73) Assignee: Lisa Draeximaier GmbH, Vilsbiburg (DE)

( * ) Notice: Subject to any disclaimer, the term of this patent is extended or adjusted under 35 U.S.C. 154(b) by 233 days.

(21) Appl. No.: 15/514,704

(22) PCT Filed: Sep. 16, 2015

(86) PCT No.: PCT/EP2015/071217
§ 371 (c)(1),
(2) Date: Mar. 27, 2017

(87) PCT Pub. No.: WO2016/050513
PCT Pub. Date: Apr. 7, 2016

(65) Prior Publication Data
US 2017/0227040 A1    Aug. 10, 2017

(30) Foreign Application Priority Data
Sep. 30, 2014    (DE) .................. 10 2014 114 165

(51) Int. Cl.
| F16B 25/06 | (2006.01) |
| F16B 25/00 | (2006.01) |
| F16B 5/02  | (2006.01) |

(52) U.S. Cl.
CPC ............ *F16B 25/0015* (2013.01); *F16B 5/02* (2013.01); *F16B 25/0047* (2013.01)

(58) Field of Classification Search
CPC ..... F16B 5/02; F16B 25/0015; F16B 25/0047
(Continued)

(56) References Cited

U.S. PATENT DOCUMENTS 2,793,884 A * 5/1957 Jungblut ............... F16L 15/003
                                                    285/231
3,955,308 A * 5/1976 Fischer ................. A63H 33/04
                                                    446/118
(Continued)

FOREIGN PATENT DOCUMENTS

DE    100 48 975 C1    7/2002
DE    203 07 622 U1    8/2003
(Continued)

OTHER PUBLICATIONS

Office Action in German Application No. DE 10 2014 114 165.2, dated Jun. 18, 2015.
(Continued)

*Primary Examiner* — Flemming Saether
(74) *Attorney, Agent, or Firm* — Finnegan, Henderson, Farabow, Garrett & Dunner LLP

(57) ABSTRACT

The present disclosure relates to a screw connection comprising a support component, an additional component and a screw to affix the support component to the additional component. The support component comprises a tube made of plastic to accommodate the screw in a friction and positive fit, wherein the tube comprises a thermoplastic foam. The screw comprises a blunt-edged screw thread. The foam is compacted as the screw is driven into the tube. The present disclosure further relates to a corresponding screw and to a method of connecting a support component to an additional component using the screw.

12 Claims, 2 Drawing Sheets

(58) Field of Classification Search
USPC .......................................................... 411/411
See application file for complete search history.

(56) References Cited

U.S. PATENT DOCUMENTS

| | | | | |
|---|---|---|---|---|
| 4,589,178 | A * | 5/1986 | Staffeld | B23B 51/08 |
| | | | | 29/240 |
| 5,704,750 | A | 1/1998 | Bartos et al. | |
| 5,722,560 | A * | 3/1998 | Mustee | D06F 1/02 |
| | | | | 220/630 |
| 6,322,307 | B1 * | 11/2001 | Glover | F16B 25/0026 |
| | | | | 411/412 |
| 7,658,581 | B2 * | 2/2010 | Sußenbach | F16B 25/0015 |
| | | | | 411/411 |
| 7,815,408 | B2 * | 10/2010 | Sessa | F16B 5/02 |
| | | | | 411/301 |
| 8,506,227 | B2 * | 8/2013 | Karupaya | F16B 25/0047 |
| | | | | 411/411 |
| 9,046,120 | B2 * | 6/2015 | Phua | F16B 25/0047 |

FOREIGN PATENT DOCUMENTS

| | | |
|---|---|---|
| DE | 10 2004 014 055 A1 | 10/2005 |
| DE | 10 2009 024 264 A1 | 12/2010 |
| DE | 201 14 907 U1 | 1/2013 |
| EP | 0 133 773 A1 | 3/1985 |
| EP | 2 185 828 B1 | 7/2012 |

OTHER PUBLICATIONS

International Search Report, International Application No. PCT/EP2015/071217, dated Dec. 12, 2015.

\* cited by examiner

SCREW CONNECTION FOR A COMPONENT MADE OF THERMOPLASTIC MATERIAL

CROSS-REFERENCE TO RELATED APPLICATION

This application is a national phase of International Application No. PCT/EP2015/071217, filed on Sep. 16, 2015, which claims priority to German Patent Application No. 10 2014 114 165.2, filed on Sep. 30, 2014. The contents of the above-referenced applications are expressly incorporated herein by reference to their entireties.

TECHNICAL FIELD

The present disclosure relates to a screw connection comprising a support component, an additional component and a screw to affix the support component to the additional component, wherein the support component has a tube of plastic to accommodate the screw in a friction and positive fit. The present disclosure also relates to a method of connecting a support component to another component using a screw.

BACKGROUND OF THE INVENTION

Plastics are used in many fields such as the automotive industry, mainly due to their great strength and low weight. Special demands are made on screw connections used to obtain a detachable connection of plastic components, demands that conventional sheet metal or wood screws either do not meet satisfactorily or not at all.

Thread-forming or thread-rolling screws are known in the state of the art and are subsumed under the term "wood screws". They are comprised primarily of a head and a screw core (i.e. a shaft) in the form of an elongated cone or pin that tapers to a point at the tip of the screw. The screw core is surrounded by a helical peripheral cutting edge projecting radially from the thread root, which transitions into the two flanks of the cutting thread with a sharp bend. The flanks in turn are provided with a constant pitch from the thread root to the crest, resulting in a uniform thread angle between the two flank lines. Screws of this kind are also used to screw plastics together.

In addition, competition focusing on light-weight construction in the automotive industry has resulted in an ever-growing range of applications for plastics, including increasing use of physical or chemical foams which replace the plastic material with air (for e.g., nitrogen or carbon dioxide). In the case of physical foams produced using a MuCell® foam injection molding process or similar processes, substances such as nitrogen, carbon dioxide or a chemical blowing agent are injected under pressure in a supercritical state into the molten plastic and uniformly distributed. After injection into the unpressurized mold, the gas separates from the smelt and forms a fine-celled foam structure. The omission of holding pressure and the reduced viscosity, minimizing or eliminating sink marks and strain are the primary aspects in support of this trend.

When used in plastics, including foamed plastics, all known screws have the disadvantage of damaging the plastic they are driven into, for instance by rupturing the screw-in openings or by stress cracking. At the same time they also require relatively high screw-in torque. In screw connections, when MuCell® injection molded parts are used, the compact layer is destroyed, with the result that a conventional screw completely loses its hold in the remnants of the foam layer.

SUMMARY

Therefore, it is the object of the present disclosure to create a screw in which a direct, heavy-duty connection between the screw and the foamed plastic is ensured at a comparatively high screw-in torque, especially in the case of plastics of different consistencies.

According to the present disclosure, a screw connection is provided that comprises a support component, an additional component and a screw to affix the support component to the additional component, wherein the support component has a tube or screw boss of plastic to accommodate the screw in a friction and positive fit. The tube here consists of thermoplastic foam and the screw has a blunt-edged thread, wherein the screw compresses the foam of the tube as it is driven in.

The profile formation according to the present disclosure enables the thermoplastic foam to closely adapt its shape to the blunt thread crests and roots by plastic deformation and friction as the screw is being screwed in, without being cut. In other words, while the screw is being screwed in the material is displaced and compacted rather than being invasively cut. Cracking and rupturing of the tube or screw-in opening are thereby avoided, as the thread impressed by the screw is more resistant to overtightening of the screw, i.e. to shearing off of cut screw threads.

The screw preferably has several threads with an outer diameter that is at least partly larger than the inner diameter of the tube. This makes certain that at least some sections of the screw penetrate into the tube without cutting into its outer compact layer.

The screw preferably has blunt threads with a flank angle of 30°-90°, preferably >60°. The blunt threads, but also a rounded out transition between the flanks and the thread root result in a notch-free screw profile, whereby stress on the plastic and/or foam is further reduced. The transition between the flanks and the thread root may occur by sections, with the thread range as the first segment having a flank angle of 30°-90° and preferably >60°. The second segment in the transition between the flank and the thread root represents a tangential transition with angles of 145°-170°. The third segment encompasses the thread root between two flanks and represents a segment of a circle with angles of 170°-180°.

The screw preferably has threads with rounded edges.

The screw preferably has a thread spacing greater than 2 mm, depending on the screw length and diameter.

An advantageous further embodiment of the present disclosure provides that the thermoplastic foam of the tube of the component is produced in a chemical or physical foaming process, specifically a MuCell® process. This yields an inner and outer tube structure for which the given screw geometry is well suited, to ensure a heavy-duty connection between the screw and the foamed plastic, especially in the case of different plastic consistencies.

At least the tube preferably consists of an integral foam or a microcellular foam with a compact outer layer. To improve the thermal insulating properties the plastic layer can include gas deposits. These gas deposits, for example, may be produced using the MuCell® process. In this method, small, precisely dosed quantities of nitrogen and carbon dioxide are introduced into the plastic smelt during the injection process. By this method, cell structures can be obtained that are stress-free and therefore uniformly dimensioned. Aside from the use of nitrogen and carbon dioxide, however, it is also possible to use other chemical or physical blowing agents.

The plastic layer preferably has a gas deposit that permits cell pore concentrations in the range of 107 to 1010 cells/cm3 by volume of the plastic layer.

The tube preferably has side walls 0.1 to 3 mm thick and a bottom 0.1 to 3 mm thick.

The support component and/or the additional component are made of plastic, usually thermoplastic foam, produced using a chemical or physical foaming process, especially a MuCell process.

The present disclosure also relates to a method of connecting a support component to another component using a screw. The method includes the following steps:

forming a support component with a tube from a thermoplastic foam, using a chemical or physical foaming process, particularly a MuCell process;

providing a screw having several blunt-edged threads with an outer diameter that is larger at least in parts than the inner diameter of the tube;

placing an additional component onto the tube; and screwing in the screw through the additional component into the tube in a non-thread-rolling manner, wherein the screw compacts the foam of the tube as it is driven in.

BRIEF DESCRIPTION OF THE DRAWINGS

Individual embodiments of the present disclosure are explained in greater detail below with reference to the drawings.

In the drawings.

DETAILED DESCRIPTION

Figure 1:
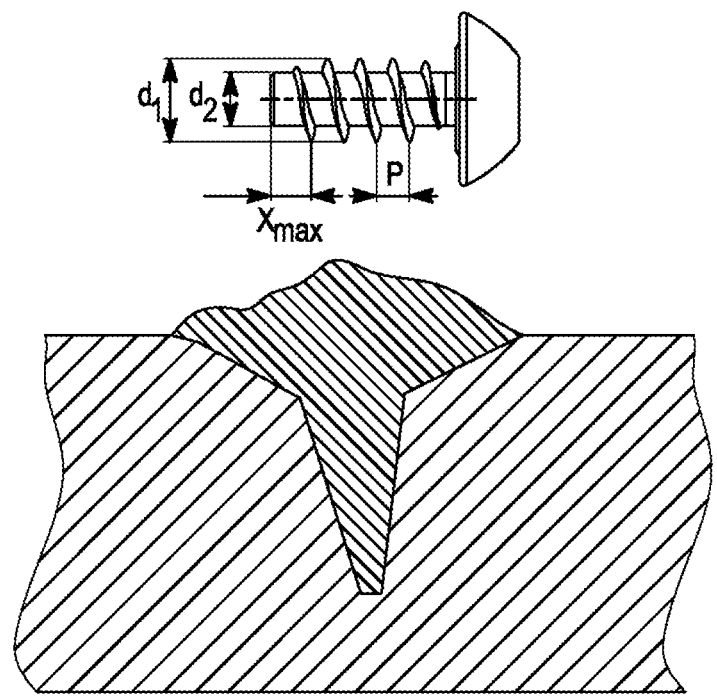
FIG. 1 shows a section through a conventional plastic tube of compact injection molded material with a thread-rolling screw (prior art)

FIG. 1 shows a lateral view of a section through a prior art plastic tube of compact injection molding material, with a conventional thread-rolling screw. When used in plastics, the known, sharp-edged screw has the disadvantage of damaging the plastic on being screwed in by rupturing the screw-in openings or by stress cracking. Additionally, relatively high torque is required to drive the screw.

In screw connections using MuCell® injection molded parts the compact layer is destroyed by this type of screw, with the result that a conventional screw completely loses its hold in the remnants of the foam layer.

Figure 2:
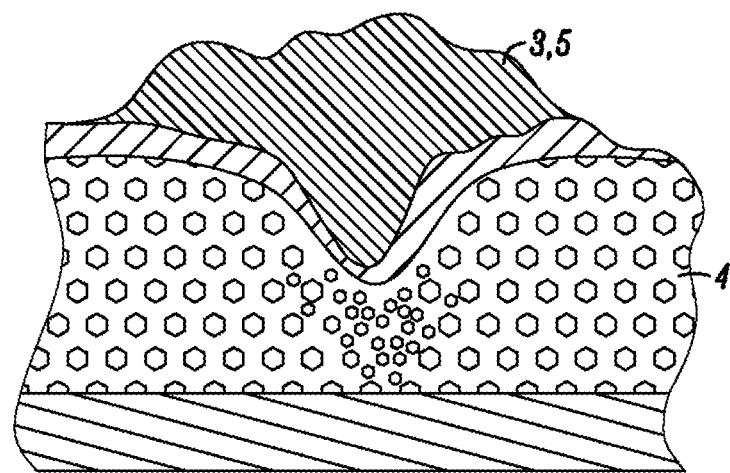
FIG. 2 shows a section through a plastic tube produced using a MuCell® process, with a screw according to the present disclosure.

FIG. 2 shows a lateral view of a section through a plastic tube 4 produced using a MuCell® or other similar process, with a screw 3 according to the present disclosure. The outer shape of the screw 3 may be conical. The diameter of the screw is typically between 1 and 8 mm. The tip of the screw may be blunt or sharply pointed. The end of the screw here can have a short, pointed cutting portion that then transitions into a blunt shape. The transition may be continuous or abrupt.

The tube 4 consists of an integral foam or a microcellular foam with a compact outer layer. Giving the screw a profile with blunt thread crests 5 and rounded thread roots enables the compact outer layer of thermoplastic foam to closely adapt its shape by plastic deformation and friction to the screw as it is being screwed in, without being cut. The material displacement or compaction is illustrated directly in FIG. 2. Cracking or rupturing of the tube 4 is avoided.

For example, the transition between the flanks and the thread root here takes place section by section. As the first segment, the outer thread area in FIG. 2 has blunt threads with flank angles of 30°-90° and preferably >60°. The transition to the second section or segment can be a clean break. The second segment in the transition between the flank and the thread root represents a tangential transition with angles of 145°-170°. The third segment encompasses the thread root between two flanks and represents a segment of a circle with angles of 170°-180°.

Figure 3:
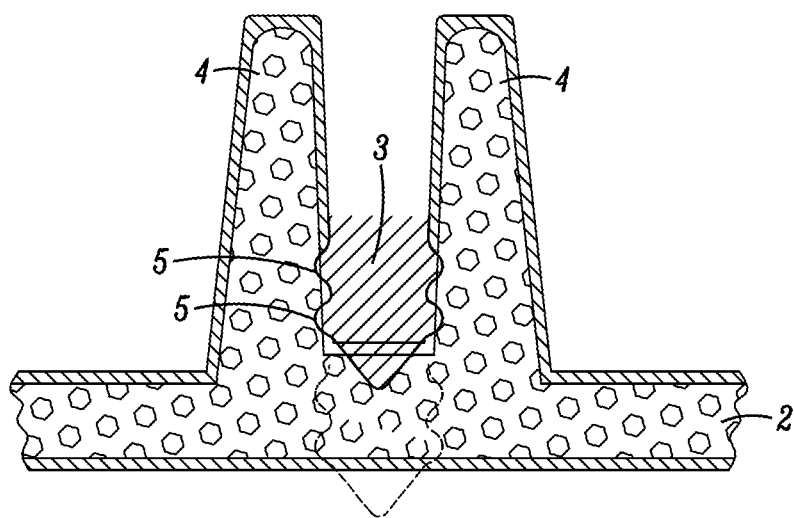
FIG. 3 shows a section through a plastic tube produced using a MuCell® process, with a screw according to the present disclosure, in an additional embodiment.

In another embodiment, FIG. 3 shows a section through a plastic tube 4 produced using a MuCell® or a similar process, with a screw 3 according to the present disclosure before and after the driving procedure. The tube 4 shown represents a stress-relief tube that is fundamentally smaller than a compact tube. When it is screwed in, the screw 3 presses itself into the outer layer of the tube 4 or it penetrates all the way through the bottom of the tube.

What is claimed is:

1. A screw connection for connection to an additional component, the screw connection comprising:

a support component made of thermoplastic foam, the support component comprising a tube, the tube including an outer layer; and a screw for screwing into the tube and for connecting the support component to the additional component when screwed into the tube, the screw comprising a blunt-edged thread for compacting the thermoplastic foam within the tube to form a friction and positive fit, wherein the outer layer has a shape deformable by the blunt-edged thread of the screw when the screw is screwed into the tube to form the friction and positive fit within the tube, and wherein the screw comprises one or more threads having an outer diameter that is greater than an inner diameter portion of the tube.

2. The screw connection according to claim 1, wherein the threads comprise flank angles of 30°-90°.

3. The screw connection according to claim 1, wherein the threads comprise flank angles of greater than 60°.

4. The screw connection according to claim 1, wherein the threads comprise rounded edges.

5. The screw connection according to claim 1, wherein the threads have a spacing of greater than 2 millimeters.

6. The screw connection according to claim 1, wherein the thermoplastic foam of the tube is produced using one of a chemical or physical foaming process.

7. The screw connection according to claim 6, wherein the thermoplastic foam of the tube is produced using a MuCell process.

8. The screw connection according to claim 1, wherein the outer layer comprises one of an integral foam or a microcellular foam.

9. The screw connection according to claim 1, wherein the tube comprises:

the outer layer having a side-wall thickness of 0.1 to 3 millimeters; and a bottom having a thickness of 0.1 to 3 millimeters.

10. The screw connection according to claim 1, wherein the support component comprises a thermoplastic foam produced using one of a chemical or physical foaming process.

11. The screw connection according to claim 10, wherein the thermoplastic foam is produced using a MuCell process.

12. A method of connecting a support component to an additional component using a screw, the method comprising the following steps:
- forming, using one of a chemical or physical foaming process, the support component with a tube made of thermoplastic foam, wherein the tube includes an outer layer;
- providing a screw having a plurality of blunt-edged screw threads, the threads having an outer diameter that is larger at least in parts than an inner diameter of the tube;
and
- screwing in the screw in a non-thread-rolling manner through an additional component into the tube, such that the foam of the tube is compacted as the screw is driven in, and
- wherein the outer layer has a shape deformable by the blunt-edged thread of the screw when the screw is screwed into the tube to form the friction and positive fit within the tube.

\* \* \* \* \*